United States Patent
Carlson

(10) Patent No.: US 6,370,496 B1
(45) Date of Patent: Apr. 9, 2002

(54) SYSTEM FOR INTELLIGENT VISUALIZATION AND CONTROL OF COMPUTER HARDWARE

(75) Inventor: Brian George Carlson, Frisco, TX (US)

(73) Assignee: Intelect Communications, Inc., Richardson, TX (US)

(*) Notice: Subject to any disclaimer, the term of this patent is extended or adjusted under 35 U.S.C. 154(b) by 0 days.

(21) Appl. No.: 09/225,155

(22) Filed: Jan. 4, 1999

(51) Int. Cl.[7] ............................................. G06F 9/455
(52) U.S. Cl. ............................. 703/27; 702/22; 702/28
(58) Field of Search ........................... 424/350; 303/28, 303/23; 717/1, 4; 345/354; 707/4, 3; 703/27, 22

(56) References Cited

U.S. PATENT DOCUMENTS 5,485,600 A * 1/1996 Joseph et al. ................ 395/500
5,966,532 A * 10/1999 McDonald et al. .......... 395/710
6,112,049 A * 8/2000 Sonnenfeld .................. 434/350

OTHER PUBLICATIONS

Szekely et al. 'Beyond Interface Builders: Model–Based Interface Tools', 5/93, ACM 0–89791–575–5/93/004, pp. 383–390.*

David Finkelman, 'Combining Visual Test with Ice Embedded System Testing', IEEE 0–7803–3330–6/96, pp. 160–161.*

Arturo Pizano et al., 'Automatic Generation of Graphical User Interfaces for Interactive Data Base Applications', ACM 0–89791–626–3/93/0011, pp. 344–355.*

Pablo Castells et al. 'Declarative Models of Presentation', ACM 0–89791–839–8/96/01, pp. 137–144.*

* cited by examiner

*Primary Examiner*—Russell W. Frejd
(74) *Attorney, Agent, or Firm*—Robert H. Frantz

(57) ABSTRACT

The inventive system provides a set of human input and output devices such as a video monitor and keyboard, in conjunction with a processing means such as a Personal Computer, an in-circuit microprocessor emulation means, and control software which allows a software developer to interactively and intelligently view the contents of bit-mapped hardware control and status registers in a descriptive manner. Further, the system interacts with the in-circuit emulator and code development environment to automatically create hexadecimal representations of complete register values to be read and written, and performs validity rule checking in order to notify the software developer if disallowed combinations of bit fields have been selected.

8 Claims, 4 Drawing Sheets

SYSTEM FOR INTELLIGENT VISUALIZATION AND CONTROL OF COMPUTER HARDWARE

TECHNICAL FIELD OF THE INVENTION

This invention relates to the control of computer hardware and microprocessor peripherals and the development of control software for such systems. This invention is especially applicable to microprocessor-based systems which employ memory-mapped and bit-mapped register control of system resources, peripherals, and subsystems.

BACKGROUND OF THE INVENTION

Current systems for developing control software for microprocessor-based systems involve a variety of "debugger" tools which provide some level of visualization of software instructions and data. Control software to be developed can be divided into several categories: computer instructions, which may be in a high level language or an assembly language; program data, which can be in the form of variables with associated variable and structure symbolic names; and system status, which includes control registers within the microprocessor, its peripherals, and memory mapped areas.

When software is compiled to executable code, it is stored in system memory in a binary format since computer memories are binary arrays of rows and columns, organized into "addresses" and "locations". Each location may be a group of 8 bits (a byte), 16 bits (a word), or 32 bits (a double word). During software development, a software design engineer may use a software development system to compile and load the software into the system memory through a variety of well-known methods, including "C" compilers, processor-specific assemblers, "debuggers" and in-circuit emulators ("ICE"). Once loaded into system memory, the software may be executed under control of the software development system. The software engineer may view the contents of memory, including software instructions, data, and system status, in binary, decimal or hexadecimal format. If the area of memory being viewed contains compiled software code, the software development system may "reverse assemble" the binary data into viewable assembly code. If the "C" source code is loaded into the software development system, the "C" source code associated with the assembly language may also be referenced and viewed. Further, if a "symbolic map" is loaded into the software development system, memory areas containing constants, variables, arrays, and other structures may be found and viewed using the name of the constant, variable, array, or structure.

Almost all microprocessor-systems contain memory-mapped and bit-mapped registers for configuration and control of the system hardware. Each register, located at a specific memory-mapped address, contains individual bits or fields of bits grouped into partial or complete bytes, words, or double words. These individual bits and fields of bits either control hardware functions and options in writable registers, or show the status of hardware functions and options in readable registers. For example, and particular register located at address 0xFFEA000 may be a control register for the interrupt controller peripheral. Further, this register may be bit-mapped as follows:

| Register Bit Slot | Function | Description |
| --- | --- | --- |
| 0 (least significant bit) | interrupt enable | 1 = enabled, 0 = disabled |
| 1–3 | interrupt type | 000 = active high |
| | | 001 = active low |
| | | 010 = rising edge trigger |
| | int. type (cont.) | 100 = falling edge trigger |
| 4 | mask interrupt | level 0 mask |
| | | (1 = masked, |
| | | 0 = unmasked) |
| 5 | mask interrupt | level 1 |
| 6 | mask interrupt | level 2 |
| 7 | mask interrupt | level 3 |
| 8–15 | Reserved, clear to 0 | |

In this example, a hypothetical control register for a system interrupt controller is given. If the software designer desires interrupts to be enabled in the system, the appropriate values for each bit in the register must be selected, then concatenated into a 16-bit hexdecimal or binary value, and finally software must be written which will write this 16-bit value to the control register located at the appropriate address.

Throughout system runtime, the software may change the value of each or all of the bits in the control registers depending on real time events and software logic. Additionally, the computer hardware may change the values of register bits dynamically to indicate the current operating mode and status. At any given time in any given state, and software designer may desire to view or check the particular value of a bit or bit field in a control or status register, or change the value of a bit or bit field in a control register. Since prior art software development systems provide only binary or hexadecimal viewing and writing of these control registers, the software designer is forced to manually perform bit and bit field extraction operations, comparison of the values to tables and charts within microprocessor and peripheral documentation and specifications, and manual calculation of new bit-mapped values.

Each microprocessor and each system peripheral may have several to hundreds of associated control and status registers, and each register has many bits and bit fields. There may be literally thousands of hardware configuration options, control functions, and status indicators to be controlled by the system software. To complicate the situation further, many combinations of hardware function selections may be mutually incompatible with other selections, and some status register indicators may change function based on modes and functions selected in other writeable control registers. Some versions of the computer hardware implementation may have known problems that preclude the use of or cause improper operation of selected options. Commonly, integrated circuit manufacturers will distribute "errata" sheets to update the original printed specification sheets for the components.

This deficiency in the software development system results in increased time to develop and diagnose software, an increase in software and system errors which remain uncorrected before release of new products, and reduced ability of a system and software designer to take full advantage of hardware functionality within the system.

There exists, therefore, a need in the art for a software development system which provides the ability to generate binary values to be written into bit-mapped hardware control and status registers based on a selection of intelligent, symbolic criteria related to the hardware specifications for microprocessor and peripheral control registers.

Further, there exists a need in the art for a software development system to allow symbolic visualization of bit-mapped registers related to the hardware specifications for microprocessor and peripheral control registers.

There exists additionally a need in the art to provide a real time trace, halt, and trigger capability in a software development system which allows a software designer or system diagnostician to specific system control and status registers values on which to take specified actions based on symbolic definitions of those bit-mapped registers.

There also exists a need in the art for such a software development system to provide rule-based verification and error detection means which reviews and validates a particular set of hardware configuration option selections, and provides a software designer warnings and error messages about detected incompatible or unavailable selections through symbolic representations.

Finally, there exists a need in the art for this software development system to be easily configured for various microprocessor, peripherals, and user-defined hardware through a system and network of encode and decode register maps and rules.

SUMMARY OF THE INVENTION

The object of the present invention is to provide a software development system which enables a software design engineer or system diagnostician to generate binary values to be written into bit-mapped hardware control registers based on a selection of intelligent, symbolic criteria related to the hardware specifications for microprocessor and peripheral control registers.

A further object of the present invention is to provide a software development system through the use of which a software design engineer or system diagnostician can symbolically visualize and inspect bit-mapped system status registers as related to the hardware specifications for the microprocessor and peripherals.

Another object of the invention is to perform real time trace, halt, and trigger functions in a software development system, thereby allowing a software designer or system diagnostician to symbolically specify values of system control and status registers on which to take specified actions.

Also, an object of the invention is to provide a system which verifies and validates bit-mapped control register option choices through a set of rules relating to valid and invalid combinations of option selections, relating warnings and error messages to a software designer or system diagnostician symbolically.

Finally, an object of the present invention is to allow the software development system to be easily configured for various microprocessor, peripherals, and user-defined hardware through a system and network of encode and decode register maps and rules.

DETAILED DESCRIPTION OF THE INVENTION

In accordance with the objects of the invention set forth in the Summary of the Invention, the system and method for intelligent visualization and control of computer hardware allows a system programmer to quickly and accurately generate binary values to be written to system hardware control registers, to symbolically view and interpret the contents of system hardware registers, and to specify particular register and bit-field values for which action is to be taken. Further advantages of the invention presented herein include ease of definition of new system hardware registers, and rule-based validation of choices made by the user for values to be written to system hardware registers.

Figure 1:
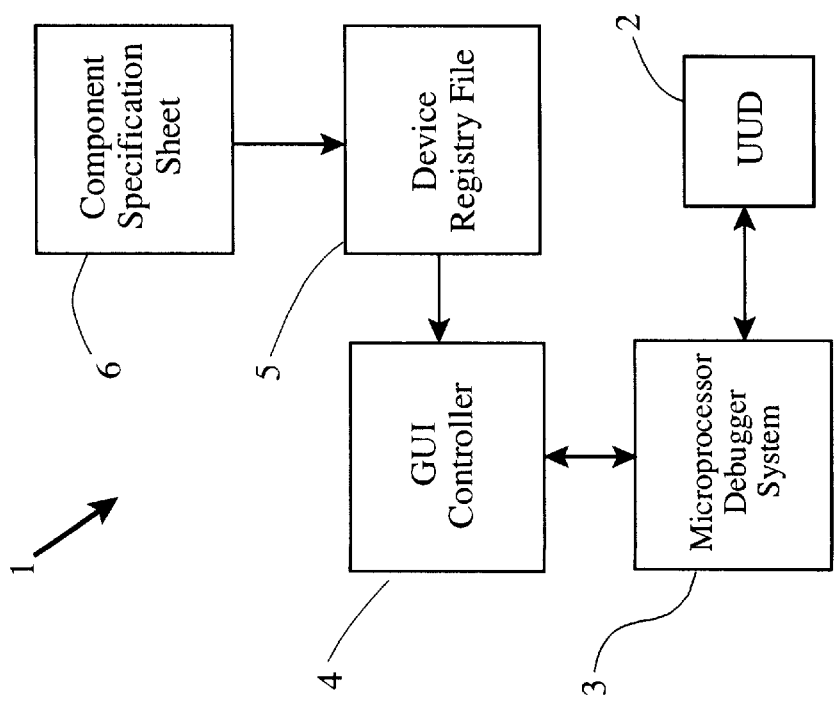
FIG. 1 shows the primary system components and their interactions with typical information and devices present during microprocessor-based system development.

Turning first to FIG. 1, a development environment (1) for a microprocessor based product requires a microprocessor debugger system (3) which allows a user to interact with a prototype of the product, or "unit under development" ("UUD") (2). Also, typically present in the development environment (1) is a number of component specification sheets (6), or "spec sheets", for each hardware component in the UUD, such as interrupt controllers, memory controllers, and communications chip sets. These printed spec sheets contain tables and descriptions of each memory-mapped control register for each hardware component, the bit fields within each register, and the options of those fields. The inventive system is implemented by adding to this environment a graphical user interface ("GUI") controller (4) and a set of device registry files (5).

Figure 4:
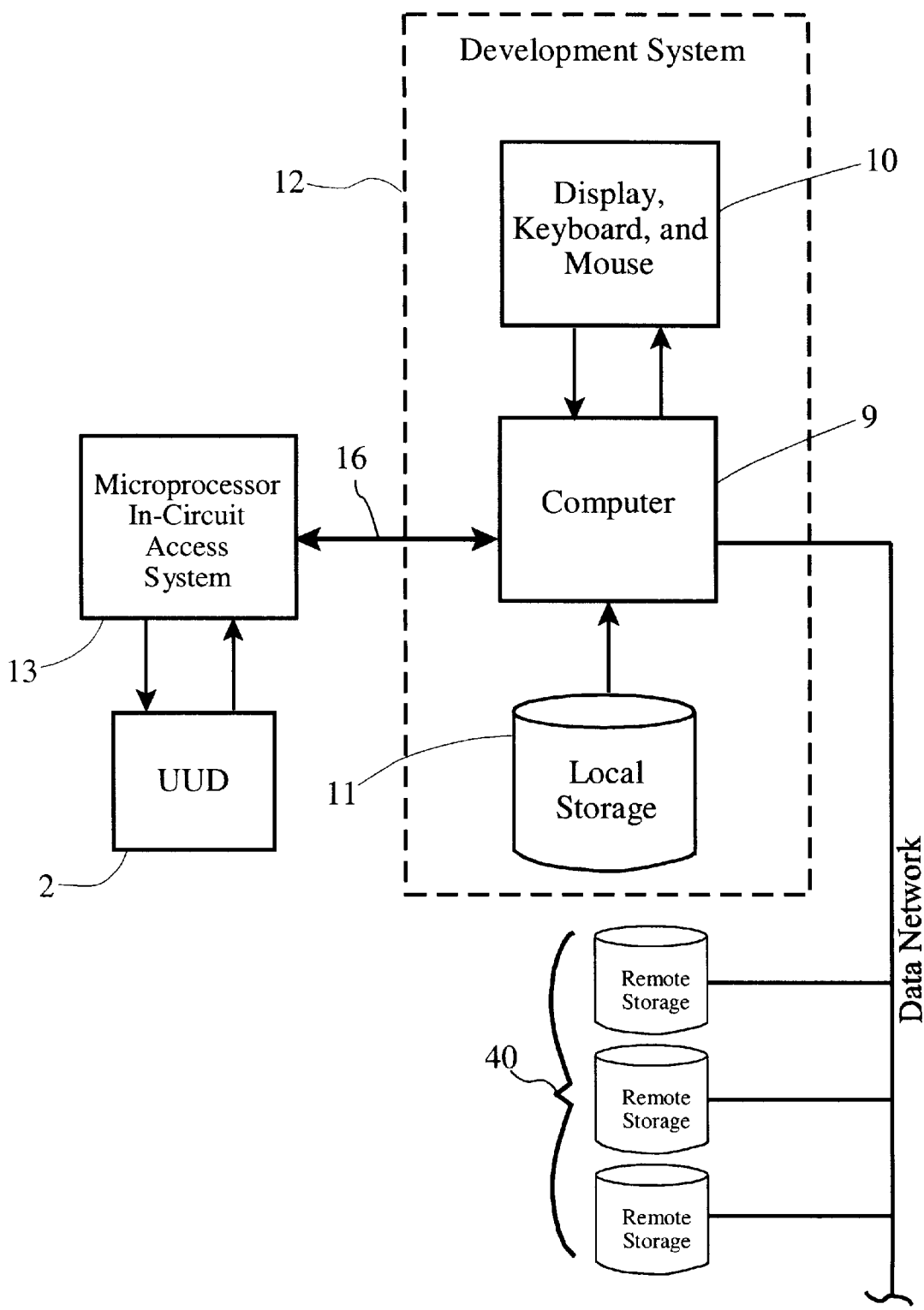
FIG. 4 sets forth the entire development system, including the possibility of network-based storage of device registry files.

FIG. 4 depicts the complete development system (12) which comprises a set of user interface devices (10) such as a keyboard, mouse, video display, and computer platform (9) such as a Microsoft Windows NT-based Personal Computer ("PC"), and local data storage (11) such as hard drives, CD-ROM drives, floppy drives, and random-access memory. The development system (12) interfaces (16) with a microprocessor in-circuit access system (13) via a local bus such as Peripheral Component Interface ("PCI"), or via a communication link such as Ethernet or RS-232. The UUD (2) is monitored and commanded by the microprocessor in-circuit access system (13) via a proprietary interface, or preferably via a standardized interface such as the Joint Testability Action Group ("JTAG") scan bus interface and protocol. The computer (9) of the development system (12) contains the hardware and software means for the microprocessor debugger system (3) and the GUI controller (4), and the device registry files may be stored in the development system's local storage (11) or on networked remote storage (40) such as Internet web-sites or LAN disk servers.

The device registry (5) is the basis for generating the graphical user interface ("GUI") display to the user. The GUI Controller (4) is a general-purpose display means, which receives the device registries and displays appropriate hex values, ON/OFF switches, radio buttons, etc. The concept of using registry files is useful for implementations of the invention in many different operating systems. The GUI Controller (4) is designed to be compatible with the native operating system of the computer platform (9) on which it is installed, such as Microsoft Windows NT, it interprets the device registries (5), and it displays status and options in a method available under the native operating system using the development system's display (10).

Many microprocessor debugger systems from manufacturers such as Texas Instruments use ActiveX [TM] controls. This allows outside "plug-in" applications to interact with the debug and development environment. The GUI Controller (4) is encapsulated into an ActiveX [TM] "plug-in" application in the preferred embodiment. This allows the microprocessor debugger system (3) to call the GUI Controller (4) at the command of the user, thereby allowing the GUI Controller to analyze and present specific data on the development system screen (10). When implemented as such, the invention may be installed into a microprocessor debugger system prior to shipment of the debugger system, or as an "after market" option after the receipt of the microprocessor debugger. Specific device registry files may be distributed with the plug-in application, and may be downloaded by the user via a modem connection or internet connection from third party suppliers.

Figure 5:
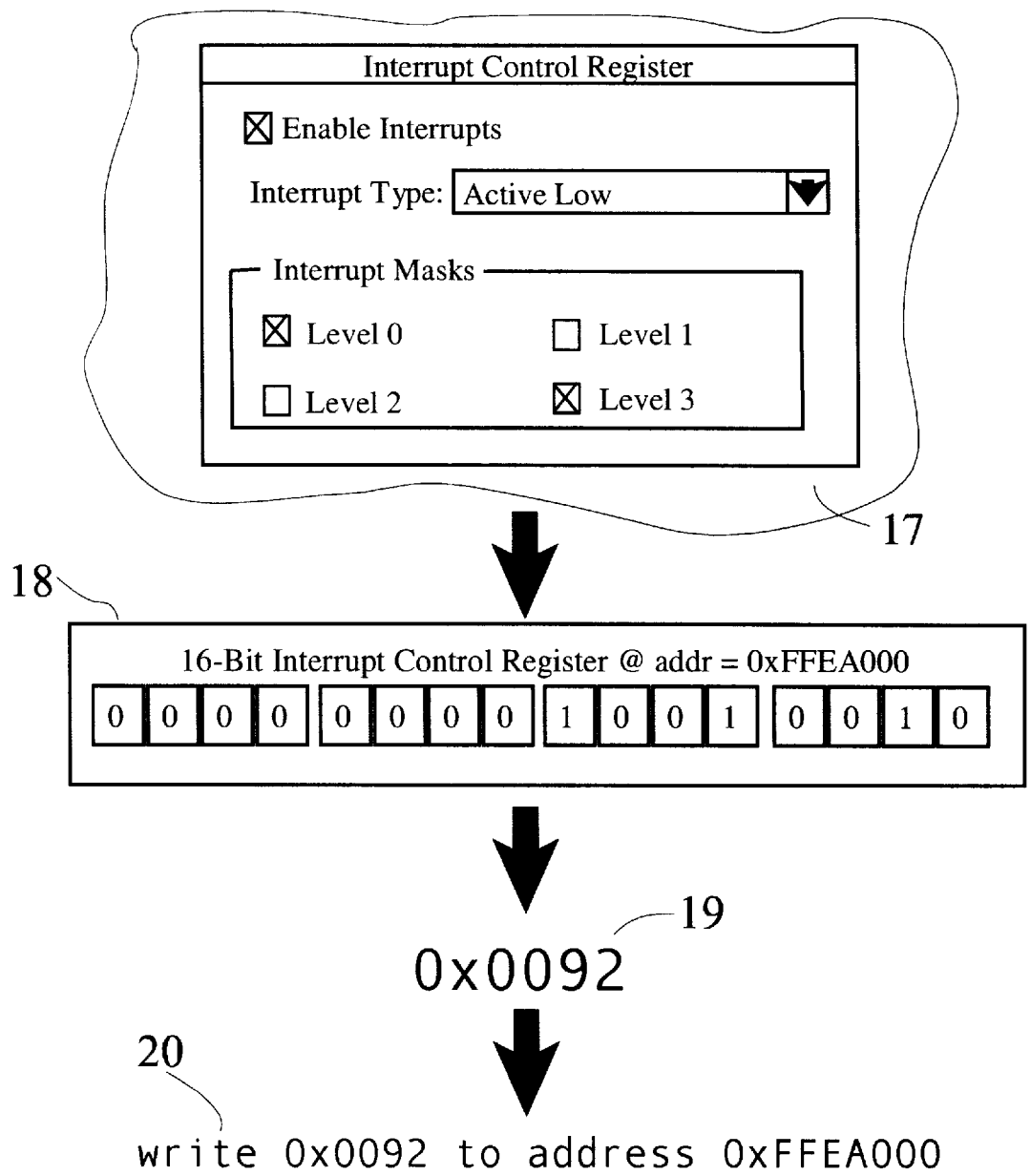
FIG. 5 shows an example relationship between a bit-mapped control register and a Graphical User Interface ("GUI") display of the contents of the register such that a software developer can readily understand each bit selection and quickly make appropriate changes.

The GUI Controller is activated when a user takes a specific action in the microprocessor debugger system. For example, when a user is currently viewing a hex value of a memory-mapped system control register and he or she wants to interpret the settings of the bit fields in that register, he or she may right-click with his or her mouse while pointing at that hex display. This will invoke an ActiveX [TM] command by the microprocessor debugger system to cause the GUI Interface Controller plug-in to receive the hex value and its address, display the text description of the values held within that register according to the device registry, and allow the user to select differing options and create a new hex value to be written to the system register. The GUI Interface Controller's rule checking means will validate the user's change, notify him or her of the potential problems, and if selected, pass the new value back to the microprocessor debugger system for writing to the system register. FIG. 5 shows this process, whereby the GUI display to the user (17) is used to select interrupts to be enabled, active low, with level 0 interrupt masked. This is concatenated by the inventive system into the binary register value (18) by referring to the appropriate device registry file (and errata file if present), and made available to the user in its equivalent hexadecimal format (19). The software developer can then enter a command into the software to write this value to the appropriate register address (20).

In a similar fashion, the code editor which the software developer uses to write and edit the high-level source code can be equipped with ActiveX [TM] interface so that the inventive system can be invoked as a "pop up" option on the screen to allow him or her to quickly determine correct hex and binary values to write into their code.

Figure 2:
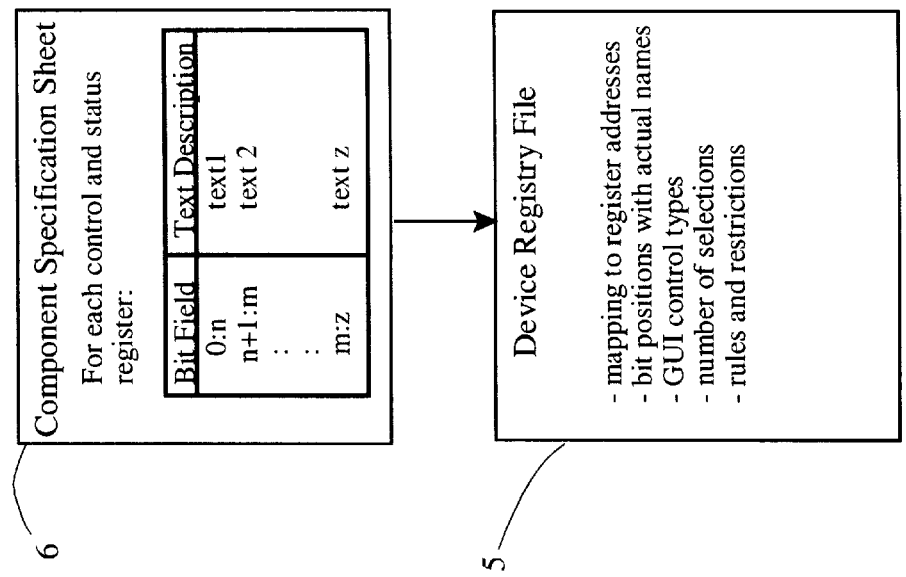
FIG. 2 shows the relationship between hardware device specification register tables and a device registry file for the inventive system.

Turning next to FIG. 2, the relationship of the printed hardware component specification sheet (6) and the device registry file (5) is shown. A typical component specification sheet (6) contains a number of tables, each of which includes text descriptions and definitions for each bit field within each memory-mapped control and status register of the component. Also included in the text description may be rules relating to the valid selections and combinations of selections made within those bit fields. A device registry file (5) is created to encapsulate these text descriptions associated with each bit field, the internal memory-mapping of the registers, the validity rules, and the types of GUI object to be associated with each bit field. The device registry file can be created by the development engineer working on the product while referring to the component specification sheet, or by the supplier or manufacturer of the component.

Figure 3:
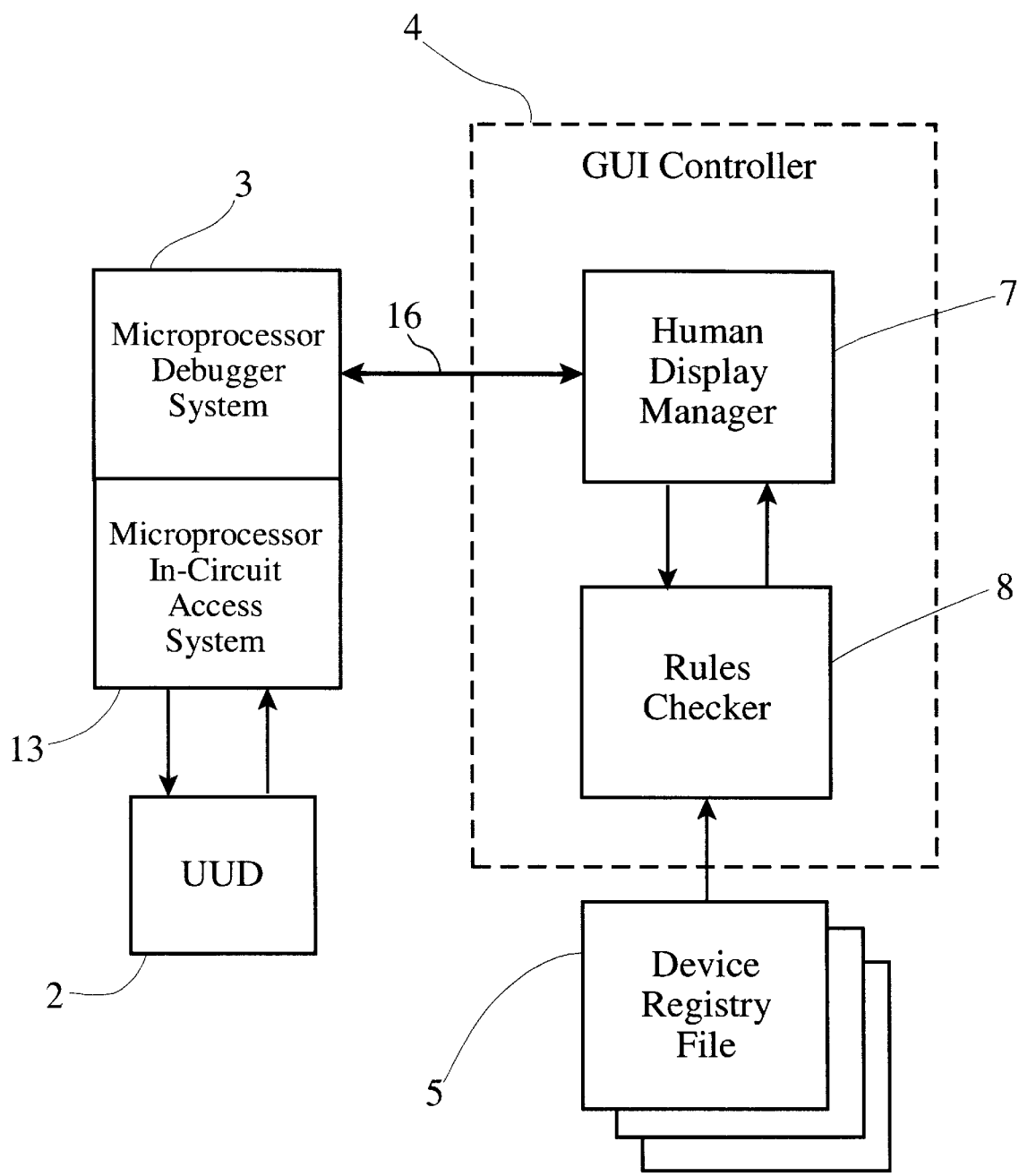
FIG. 3 depicts the functional interaction between the GUI Controller, the microprocessor debugger system, a unit under development, and the device registry files.

Finally, turning to FIG. 3, the interaction of the GUI Controller (4) with the device registry files (5) and the microprocessor debugger system (3) is given. Within the GUI Controller (4) are two primary means of functionality, the first of which is a human display manager (7). The human display manager receives specific data and address information from the debugger (3) via ActiveX control means (16) in the preferred embodiment. The display manager (7) then queries the rule checker (8), the second primary functional means of the invention, for bit field descriptions and GUI objects associated with that hardware register based on the address of the register supplied by the debugger. The rule checker (8) searches and finds the related bit field information and GUI object selections in the device registry file for that component, and returns that information to the display manager (8). Finally, the display manager produces the appropriate GUI objects on the development systems video monitor.

When a user change selection is made, the display manager (7) receives that from the development system's keyboard or mouse, and transfers the requested change value to the rule checker (8). The rule checker then searches the device registry files (5) for the appropriate rules, completes a validity analysis, and returns an error or warning message to the display manager (7). Warnings and errors are then displayed by the display manager to the user. Upon confirmation of the change selection by the user, the display manager (7) sends an ActiveX command to the microprocessor debugger system (3), which then relays the change to the UUD via the access system (13).

The invention set forth herein is described in such detail that one familiar with design and implementation of microprocessor-based development tools can understand the concept and function of the invention. Further, specific preferred embodiment details such as the use of JTAG and ActiveX [TM] in the implementation, have been given. However, it will be appreciated by those skilled in the relevant arts that minor changes from the specified embodiment details will not depart from the spirit and scope of the invention.

I claim:

1. A human-operable system for intelligent visualization and control of control and status registers of computer hardware in a hardware and software design debug workstation, said workstation having a processing means for executing control software, a user display device, a user input device, and one or more means for microprocessor in-circuit emulation, said emulation means having one or more bit-mapped control and status registers, said system comprising:

one or more device registry data files receivable by said processing means and operable by said software being executed by said controller processing means, said device data registry files containing one or more relational definitions of bit field values for said bit-mapped control and status registers of said computer hardware to human interpretable values, such that said processing means may perform upon command from a human operator received at said input device a conversion of bit field values to said human interpretable values; and a bit field display and manipulation means for displaying said human interpretable values and for receiving from a human operator input for said control and status registers in a human interpretable value.

2. The human-operable system for intelligent visualization and control of control and status registers of computer hardware according to claim 1 wherein said human interpretable values in said device data registry files further comprise one or more descriptive text strings.

3. The human-operable system for intelligent visualization and control of control and status registers of computer hardware according to claim 2 wherein said descriptive text strings are organized and presented display device in the form of a list of options.

4. The human-operable system for intelligent visualization and control of control and status registers of computer hardware according to claim 2 wherein said descriptive text strings are organized and presented to said display device in the form of selectable check boxes.

5. The human-operable system for intelligent visualization and control of control and status registers of computer hardware according to claim 2 wherein said descriptive text strings are organized and presented to said display device in the form of selectable radio buttons.

6. The human-operable system for intelligent visualization and control of control and status registers of computer hardware according to claim 1 wherein said device registry files further comprise a set of rules which relate allowable selections of bit field values with respect to other bit field values, and wherein said software further comprises a means to compare human-selected bit field values to said rule set and to indicate to a human operator if one or more rules are not met, said indication being made as a visual indicator on said display device.

7. The human-operable system for intelligent visualization and control of control and status registers of computer hardware according to claim 1 wherein said device registry files are disposed in a locally accessible memory means.

8. The human-operable system for intelligent visualization and control of control and status registers of computer hardware according to claim 1 wherein said device registry files are disposed in a remotely accessible memory means.

* * * * *